United States Patent [19]
Denkowski

[11] 3,721,133
[45] March 20, 1973

[54] ANTI-BACKLASH SCREW JACK
[75] Inventor: Walter J. Denkowski, King of Prussia, Pa.
[73] Assignee: Philadelphia Gear Corporation, King of Prussia, Pa.
[22] Filed: Oct. 7, 1971
[21] Appl. No.: 187,325

[52] U.S. Cl. ................................................74/441
[51] Int. Cl. ............................................F16h 55/18
[58] Field of Search ......................................74/441

[56] References Cited
UNITED STATES PATENTS

| 2,498,897 | 2/1950 | Riedel | 74/441 |
|---|---|---|---|
| 2,959,064 | 11/1960 | Geyer et al. | 74/441 |
| 3,479,897 | 11/1969 | Holthofer | 74/441 |

Primary Examiner—Leonard H. Gerin
Attorney—Henry N. Paul, Jr. et al.

[57] ABSTRACT

An anti-backlash screw jack has a worm gear which is supported by upper and lower annular bearings both of which remain fully loaded despite wear on the worm-gear threads and downward shifting of the anti-backlash nut. The worm gear has an integral upwardly extending sleeve portion, the lower portion of which is internally splined and the upper portion of which is internally threaded. The upper portion of the sleeve is thinner than the lower. Both portions of the sleeve are spaced radially from the load stem and an annular space is formed therebetween. Threaded on the load stem above the worm gear and within the annular space formed by the sleeve is an anti-backlash nut, the lower portion of which is externally splined to the worm-gear sleeve. There is an annular space between the upper portion of the anti-backlash nut and the internally threaded upper portion of the worm-gear sleeve into which is received a take-up nut which is externally threaded and in mesh with the upper portion of the worm-gear sleeve. An annular cap is screwed into the housing and bears down on an annular upper bearing which is outside the worm-gear sleeve. The lower race of this bearing bears against a shoulder on the worm gear which bears against the upper race of an annular lower bearing which is supported in the housing.

4 Claims, 2 Drawing Figures

PATENTED MAR 20 1973

3,721,133

INVENTOR.
Walter J. Denkowski
BY
Paul + Paul
ATTORNEYS.

ANTI-BACKLASH SCREW JACK

BACKGROUND OF THE INVENTION

The present application relates to an anti-backlash screw jack of the general type shown in McMullen U.S. Pat. No. 3,323,777.

In the McMullen patent, the worm gear is connected to an anti-backlash nut by an annular array of spaced vertical driving pins. The driven anti-backlash nut is supported by an annular upper bearing which is held down by a cap screwed into the housing. As wear occurs on the threads of the worm gear and the load stem gradually drops, the anti-backlash nut is carried downwardly, being guided by the driving pins. This downward movement of the anti-backlash nut unloads the annular bearings, until the cap screw is tightened.

SUMMARY OF THE INVENTION

A principal object of the present invention is to provide an improved anti-backlash screw jack in which the bearings remain fully loaded as the anti-backlash nut drops gradually downwardly as the worm-gear threads wear down.

A further object is to provide an anti-backlash screw jack which avoids the use of driving pins as the coupling means for connecting the worm gear to the anti-backlash nut.

Another object is to provide an anti-backlash screw jack having calibrated markings thereon to inform the maintenance man of the extent to which the threads of the worm gear have been worn down, thereby giving the maintenance man advance notice as to when replacement of the worm gear will be necessary.

The foregoing objects are accomplished, in accordance with the present invention, by providing a worm gear supported by annular upper and lower bearings held down by an annular cap screwed or bolted into the housing. The worm gear is provided with an upwardly extending integral sleeve portion which is spaced radially from the load stem, forming therebetween an annular space. The upper portion of the sleeve is internally threaded, and is thinner than the lower portion, so that the upper portion of the annular space is wider than the lower. Received within the annular space is an anti-backlash nut threaded onto the load stem above the worm gear and separated from the worm gear by a wear gap of preselected dimension. The lower portion of the anti-backlash nut is externally splined and in engagement with the internal splines of the lower portion of the worm gear sleeve. Between the upper portion of the anti-backlash nut and the internally threaded upper portion of the worm-gear sleeve is an annular space which receives an annular take-up nut which is externally threaded. The lower end of this take-up nut is adapted to bear against an annular shoulder on the anti-backlash nut. As wear occurs on the threads of the worm gear, the load stem gradually drops, carrying with it the anti-backlash nut. This downward movement of the anti-backlash nut is guided by its external splines. There is not unloading effect on the annular bearings of the worm gear. These bearings remain fully loaded whether or not the take-up nut is tightened.

DETAILED DESCRIPTION OF THE PREFERRED EMBODIMENTS

Figure 1:
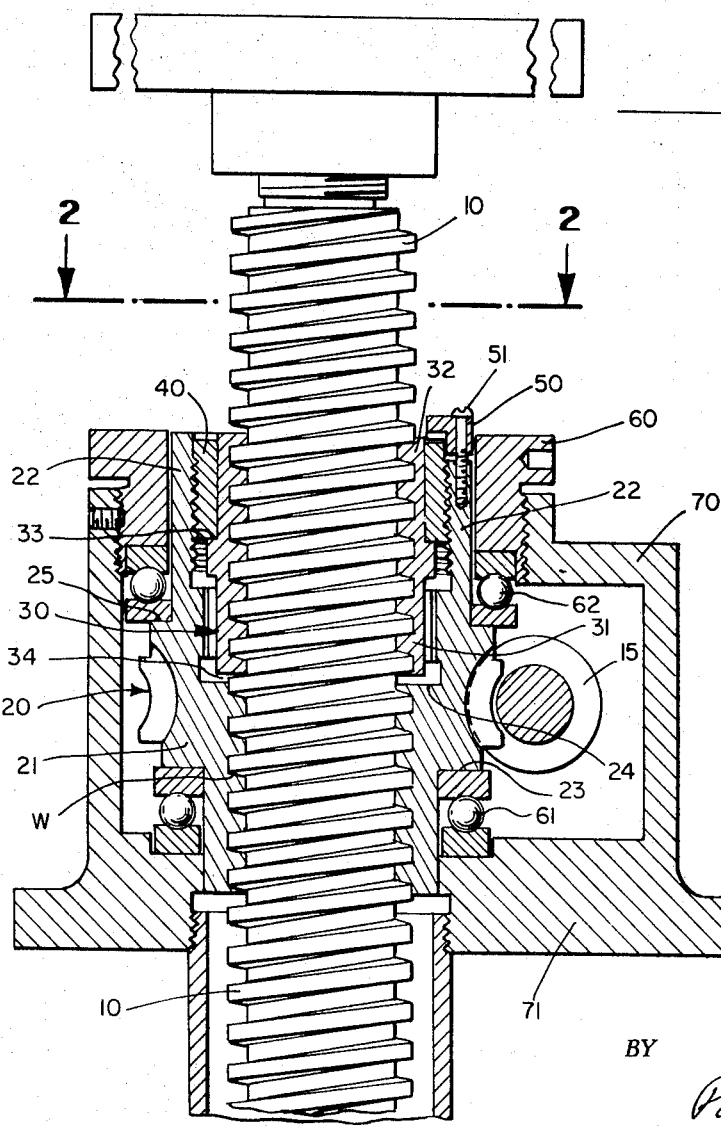
FIG. 1 is an elevational view, largely in section, showing an anti-backlash screw jack embodying the present invention.

In FIG. 1 a screw jack is shown having a housing 70 which supports an externally threaded load stem 10 driven by a worm gear 20 which is driven by a worm 15. The lower portion 21 of worm gear 20 is threaded and meshes with threads of load stem 10. This lower portion 21 functions as the drive portion of the worm gear. An annular lower bearing 61 is supported on base 71 of housing 70 for supporting worm gear 20 at an external shoulder 23.

In accordance with the present invention, above the drive portion 21 worm gear 20 is provided with an integral sleeve portion 22 which is spaced radially from the threads of load stem 10. In the annular space between the sleeve portion 22 of worm gear 20, an anti-backlash nut 30 is provided in mesh with stem 10. The lower end of anti-backlash nut 30 is initially spaced above an internal shoulder 24 of worm gear 20 by a selected distance, forming a wear gap 34. Wear gap 34 allows the anti-backlash nut 30 to move downwardly with the load stem 10 relative to the worm gear 20 as the upper surface of the threads W of the worm gear 20 wear away.

The lower portion 31 of anti-backlash nut 30 is externally splined and mates with internal splines on the lower portion of sleeve portion 22 of worm gear 20. The upper portion 32 of the anti-backlash nut 30 is externally smooth and makes a sliding fit with the internally smooth surface of an annular take-up nut 40 which occupies the annular space between the anti-backlash nut 30 and the sleeve portion 22 of the worm gear 20. Take-up nut 40 is externally threaded and in mesh with the internal threads on the upper portion of sleeve portion 22 of worm gear 20. Anti-backlash nut 30 has a central radial projection forming a shoulder 33 against which the lower end of take-up nut 40 is adapted to bear.

An annular cap 60 is threaded or bolted into the housing 70, and an upper annular bearing 62 is provided between the undersurface of the cap 60 and an external shoulder 25 of worm gear 20. It will be noted that the annular bearing 62 is outside the worm-gear sleeve portion 22 and that downward movement of the anti-backlash nut 30 into wear gap 34 does not unload bearing 62.

Figure 2:
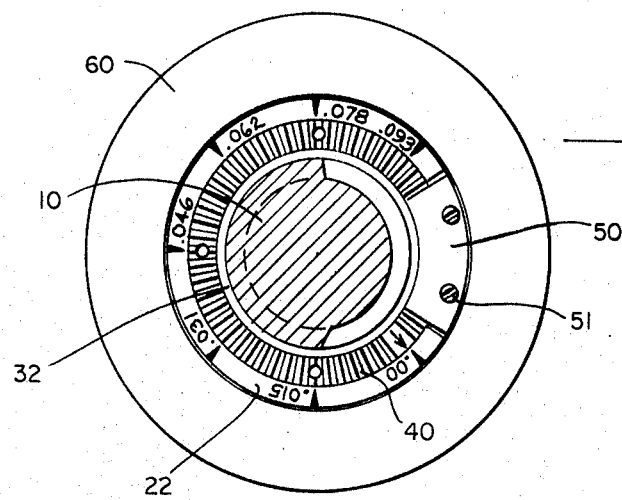
FIG. 2 is a plan view of the screw jack of FIG. 1, taken at section 2—2 of FIG. 1.

The width of wear gap 34 in the axial direction of stem 10 is made equal to the maximum wear to be permitted on the threads of worm gear 20. For example, the width of wear gap 34 may be 0.093 inches. The upper end surface of sleeve portion 22 of worm gear 20 may preferably be provided with radial markings calibrated to correspond to the movement in inches of the anti-backlash nut 30 downwardly into wear gap 34 when the take-up nut 40 is turned downward in the internal threads of sleeve portion 22. An arrow mark provided on the top of take-up nut 40 indicates the amount of downward movement of the anti-backlash nut 30. A segmental locking plate 50, best seen in FIG. 2, is provided, the undersurface of which is serrated to correspond to the serrations on the upper surface of take-up nut 40. Locking plate 50 is secured to sleeve portion 22 as by screws 51.

OPERATION

In the course of normal use of the screw jack, the upper surface W of the threads of worm gear 20 tends to wear away gradually. As this wear occurs, load stem 10 gradually drops, relative to worm gear 20, thereby creating space between the upper surface of the threads of stem 10 and the lower surface of the threads of worm gear 20.

When load stem 10 moves downwardly, due to wear on the threads of worm gear 20, as just described, stem 10 carries down with it the anti-backlash nut 30. In this downwardly movement, anti-backlash nut 30 is guided by the splines of its splined connections to the sleeve portion 22 of worm gear 20.

Until the maintenance man tightens the take-up nut 40, a backlash condition exists in the screw jack. However, as previously noted, there is no unloading effect on the angular bearing 62. Bearings 61 and 62 remain fully loaded, before take-up nut 40 is tightened. Tightening take-up nut 40, by turning it rotationally in sleeve portion 22, causes the lower end of take-up nut 40 to bear against the shoulder 33 of anti-backlash nut 30. This eliminates the backlash condition, since load stem 10 is no longer able to move upwardly relative to worm gear 20 despite the existence of wear space between the upper surface of the threads of load stem 10 and the under surface of the threads of worm gear 20.

After the maintenance man has initially tightened take-up nut 40, as wear takes place at the upper surface of the threads of worm gear 20, a backlash condition is created. Thus, further tightening of take-up nut 40 becomes necessary to eliminate the backlash condition. Tightening of take-up nut 40, from time to time, continues until anti-backlash nut 30 has moved downwardly through the entire distance of wear gap 34, making impossible further downward movement of the anti-backlash nut.

In order that the maintenance man may have advance indication as to the extent of wear on the threads of worm gear 20, as evidenced by the downward movement of the stem 10 and anti-backlash nut 30, the annular upper end surface of sleeve portion 22 of worm gear 20 may be provided with radial markings calibrated to read in terms of inches of wear gap. In a typical case, the wear gap 34 may have a length of .093 inches in the axial direction of stem 10 and the annular upper end surface of sleeve portion 22 may be calibrated accordingly.

As wear on the threads of worm gear 20 occurs, the maintenance workman will, from time to time, unscrew and remove locking plate 50 and rotate take-up nut 40 in a direction to move the take-up nut downwardly until its lower end bears against the shoulder 33 of the anti-backlash nut 30, thereby to prevent lifting of the anti-backlash nut by the stem 10 upon reversal of direction of drive.

Adjustment of the take-up nut 40 is made from time to time until the wear gap 34 has been fully closed by the anti-backlash nut. The fact that the wear gap 34 is approaching being fully closed is communicated to the maintenance man by a reading of the calibrated markings on the upper end of sleeve portion 22 of worm gear 20. Thus, the maintenance man is able to anticipate the necessary replacement of the worm gear 20 and to place an order for a replacement sufficiently in advance to avoid delay.

What is claimed is:

1. An anti-backlash screw jack comprising:
   a. a housing;
   b. an externally threaded load screw;
   c. a worm gear having an internally threaded drive portion in mesh with said load screw;
   d. said worm gear having an integral sleeve portion extending upwardly from said drive portion and spaced radially from said load screw forming therebetween an annular space, the upper portion of said sleeve portion being internally threaded;
   e. an anti-backlash nut in said annular space in mesh with said load stem and spaced above said drive portion of said worm gear by a maximum wear gap;
   f. means connecting the lower portion of said anti-backlash nut to said worm-gear sleeve portion while allowing for relative sliding movement therebetween in the axial direction of said load stem;
   g. an annular take-up nut in the annular space between the upper portion of said anti-backlash nut and the upper portion of said sleeve portion of said worm gear;
   h. said take-up nut being externally threaded for engagement with the internally threaded upper portion of said sleeve portion of said worm gear;
   i. said anti-backlash nut having a shoulder against which the lower end of said back-up nut is adapted to bear when tightened;
   j. means for driving said worm gear rotationally relative to said stem, thereby to also drive rotationally said sleeve portion and said anti-backlash nut;
   k. said take-up nut being adapted to be turned manually relative to said sleeve portion to impress an axial thrust on said anti-backlash nut;
   l. upper and lower annular bearing means supporting said worm gear in said housing against thrust forces in both axial directions, the loading on said bearing means remaining substantially unchanged despite axial movement of said anti-backlash nut relative to said worm gear due to wear on said worm-gear threads.

2. Apparatus according to claim 1 characterized in that:
   a. said means connecting said lower portion of said anti-backlash nut to said worm-gear sleeve portion comprises external splines on said anti-backlash nut and internal splines on said worm-gear sleeve.

3. Apparatus according to claim 2 characterized in that:
   a. an annular cap is provided threadable into the housing of said screw jack for maintaining said upper annular bearing in direct engagement with said worm gear.

4. Apparatus according to claim 3 characterized in that the upper end of said worm-gear sleeve portion is provided with radial markings calibrated to correspond to the movement of said anti-backlash nut into said wear gap.

* * * * *